United States Patent Office 3,151,031
Patented Sept. 29, 1964

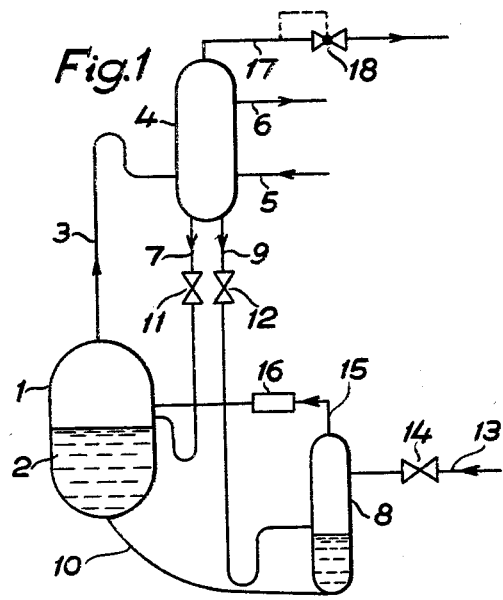
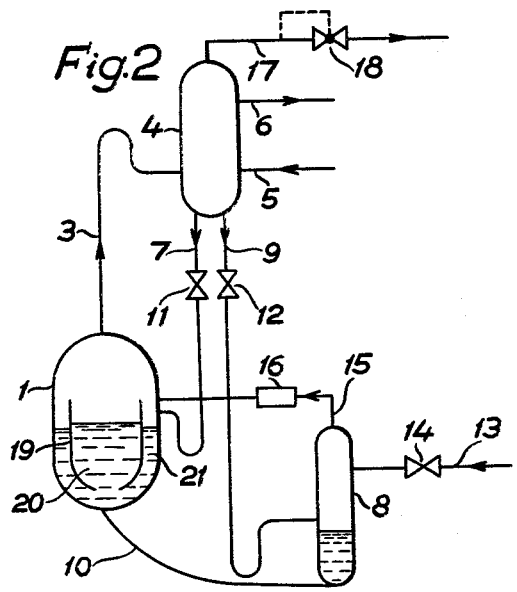

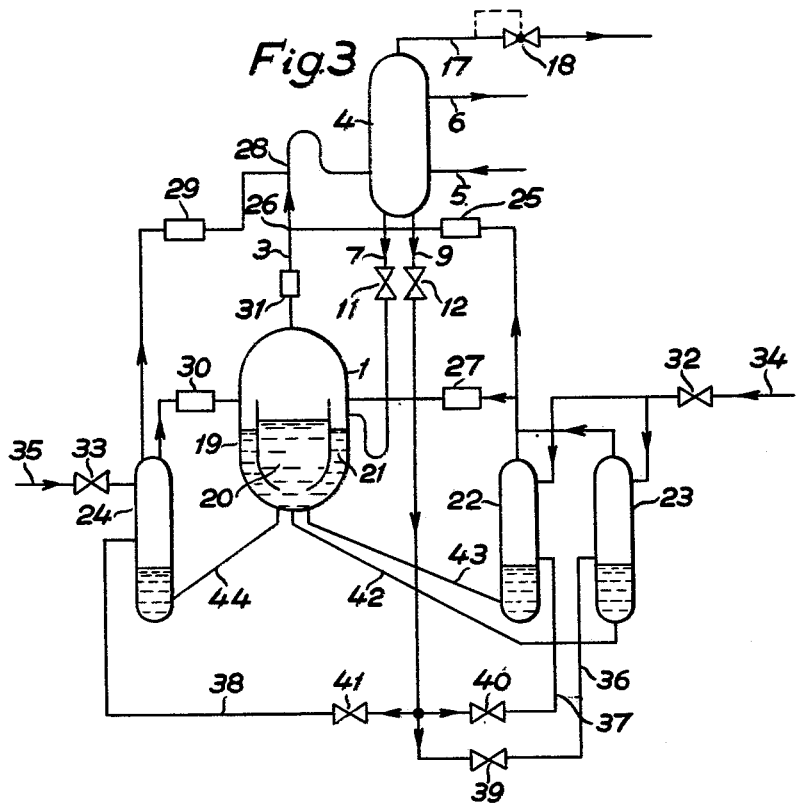

3,151,031
METHOD OF REGULATING THE OPERATION OF HOMOGENEOUS NUCLEAR REACTORS
Olle Lindström, Vasteras, Sweden, assignor to Allmanna Svenska Elektriska Aktiebolaget, Vasteras, Sweden, a corporation of Sweden
Filed Dec. 22, 1960, Ser. No. 77,546
Claims priority, application Sweden, Dec. 22, 1959, 12,059/59
7 Claims. (Cl. 176—20)

During operation, a homogeneous boiling reactor produces steam which is condensed while the heat thus liberated is taken care of. The steam is formed in the actual reactor vessel, where the fuel composition is, by volatization of the moderator. The heat is taken care of in the condensers. These condensers, possible recombiners for radiolytic gas and other means, through which the vapor or a portion of the vapor is led and associated conduits for introducing vapor and conduits for returning the condensate, together form a system which in the following will be called the primary vapor circuit of the reactor.

Homogeneous boiling reactors show great advantages in comparison with other homogeneous reactors where the reactor flows circulate through heat exchangers. Amongst the advantages may be mentioned that the radioactive solution or dispersion is completely enclosed in the reactor vessel and fuel preparing equipment and does not come into contact with the heat transfer surfaces, that circulation pumps can be dispensed with, that the thermal efficiency is higher and that the risk of excursions is small because of the rapid self-stabilization upon sudden fluctuations of reactivity. However, little interest has been shown in homogeneous boiling reactors, mainly because of the supposed difficulties in starting, operation, and shut down from which it follows that repairs and replacement of damaged apparatus, such as feed pumps, control valves or other required equipment for process control in contact with the fuel composition are very complicated and may cause a very long shut-down time for the reactor. The reason for these circumstances is the extremely strong radioactivity of the fuel composition. Because fuel compositions in the form of solutions of feasible fissile material in water are instable when in contact with stainless steel and in the oxygen deficient conditions prevailing in the boiling core, attention has been directed to fuel compositions in the form of dispersions. The use of such dispersions, however, entails further difficulties as a result of the risk of sedimentation and plugging.

The present invention is directed to a solution of the problems which exist in the operation of homogeneous boiling reactors. Difficulties arising previously are avoided by regulating the starting, operation and shut-down of the reactors with the use of a minimum of movable parts so that that part of the apparatus in contact with the fuel composition requires no maintenance. The invention also makes possible a rapid and safe dumping of the reactor vessel when necessary.

With heterogeneous heavy water reactors it is known to regulate the operation by controlling the moderator level in the reactor vessel. The moderator chamber is thus put in communication with an auxiliary vessel and the level of the moderator is controlled by regulating the pressure in the auxiliary vessel.

The favourable results according to the present invention, which relates to a homogeneous boiling reactor, which reactor comprises a reactor vessel containing a moderator in the form of a liquid and a fiissile material dissolved or dispersed in at least one part of the moderator, and which reactor produces steam from the moderator, the heat content of which is taken care of during condensation of the steam in a primary steam cycle, are obtained by putting the reactor vessel in liquid transport communication with at least one sub-critical auxiliary vessel and by distributing the moderator, with or without the content of fissile material, between the reactor and each additional vessel by regulating the pressures in the gas phases in the respective vessels. This regulating of the pressure is effected by a flowing gas which is led between the auxiliary vessel and the reactor vessel or the primary steam circuit via one or several pipes containing regulating means producing a resistance to the flow of the gas. Thus, from each auxiliary vessel, the flowing gas can be led, through one pipe containing a regulating means, to the reactor vessel or to a point in the primary steam circuit. It may be advantageous to divide the flowing gas from each auxiliary vessel into several streams so that one is led via a pipe containing a regulating means to a point in the primary steam circuit and one or several others via other pipes containing regulating means producing a resistance to the flow of the gas, to other points in the primary steam circuit or to the reactor vessel. In a reactor in which the fuel composition within the reactor vessel, is divided, for example by partition walls, into zones between which a movement of liquid can occur via openings in the walls, it is advisable to take certain precautions as regards leading the condensate back to the reactor vessel. Thus, if the fuel composition is divided, for instance, into an outer zone (reflector zone) containing moderator and an inner zone (core zone) containing the same moderator with fissile material dissolved or dispersed therein and possibly fertile components, it is advantageous to lead the liquid obtained when the steam is condensed to the reactor vessel in such a way that the desired distribution of the fuel composition is maintained. The condensate can be led to the reactor vessel either directly or by way of the auxiliary vessel, or in both ways simultaneously.

By "sub-critical auxiliary vessels" is meant vessels which have such a shape that the fuel composition cannot become critical in them, i.e. they are somewhat longish. The expression "primary vapor circuit of the reactor" has been defined in the introduction to the description. The auxiliary vessel and connection pipes, provided for the moderator or fuel composition, between the reactor vessel and the auxiliary vessel are not counted as appertaining to the steam circuit but form additional arrangements for the reactor vessel. The purpose of each regulating means is to give a defined and adjustable pressure drop. Conventional technique is made use of for the practical design of the regulating means producing a resistance to the flow of the gas. The simplest form for a regulating means, of course, is a throttle valve.

As the flowing gas, one is suitably chosen with low absorption cross section for neutrons such as deuterium, helium and oxygen, but even hydrogen, nitrogen, neon and argon could with advantage be used. The choice of gas is influenced by the chemical composition of the reactor core.

The number of auxiliary vessels depends on the size of the reactor and on the fuel composition. The auxiliary vessels may have different functions. Some of the vessels could be provided for coarse and fine regulation of the content of fuel composition in the reactor vessel, others for fuel storage during shut-down, still others for emergency dumping, sampling, etc. Some auxiliary vessels could be arranged to operate in parallel in a common pressurizing system, while others could be arranged to operate independently. It is suitable to arrange the individual auxiliary vessels so that when necessary they can be arbitrarily connected in parallel or disengaged. In this way maximum flexibility is obtained and the disposal of the auxiliary vessels can be altered during operation with regard to different operation conditions. The different auxiliary vessels are formed with regard to their functions. In the first place, therefore, the diameter of the vessels can be varied within the limits governed by the requirements of non-criticality.

The invention is described more closely in connection with the accompanying schematical figures which, as examples, show different arrangements for performing the method according to the invention. So that the figures shall be as clear as possible, only a small number of auxiliary vessels has been included in them.

FIGURE 1 shows an arrangement for performing the method according to the invention, in which all the flowing gas goes from an auxiliary vessel to a point in the reactor vessel and in which the condensate formed is returned to the reactor vessel both directly and via the auxiliary vessel.

FIGURE 2 shows another arrangement wherein the flowing gas goes the same way as in FIGURE 1 and where the condensate is returned to an outer zone in the reactor vessel, both directly and via an auxiliary vessel.

FIGURE 3 shows an arrangement where the flowing gas passes partly to two parallel connected auxiliary vessels and partly to an auxiliary vessel independent from the other two. When the gas has passed all the auxiliary vessels, it is divided into two streams, one of which goes to the reactor vessel and another to a point in the primary steam circuit.

The boiling core 2 of the reactor vessel 1, which core contains a moderator, in this example heavy or light water, produces steam in the arrangement according to FIGURE 1, which rises to the condenser 4 via the conduit 3. The steam is condensed here transferring its heat content to the secondary coolant supplied at 5 and withdrawn at 6. The condensate is returned to the reactor vessel partly directly via the conduit 7 and partly through the auxiliary vessel 8 via the conduits 9 and 10. The distribution of the condensate between these return paths is regulated by the valves 11 and 12. The gas, supplied via the conduit 13 from an outer pressure source, first passes the control valve 14 and thereafter the auxiliary vessel 8 before it reaches the reactor vessel via a conduit 15 with regulating means 16. The adjustable regulating means 16 gives a defined pressure drop to the flowing gas, which means that, assuming a constant pressure of the gas source connected to the conduit 13, a constant differential pressure is established between the gas phases of the vessels 1 and 8 and thus a constant level of the liquid in the reactor vessel is maintained, thus giving a constant reactivity of the reactor fluid. In the reactor vessel the gas is mixed with steam and accompanies this to the condenser 4 from which it escapes after the condensation of the vapor as residual gas via the conduit 17 with its control valve 18. In the figure only one condenser 4 has been schematically indicated, whereas in practice the primary steam circuit as a rule contains, besides the arrangements 3, 4, 7, 9, 11 and 12 shown in the figure, several condensers, recombiners, possible drop and mist separators or similar arrangements through which the steam, a part of the stem, or the condensate is led. From the conduit 17 the gas goes to arrangements for disposal of any radioactive components present in it. The described arrangement has no components with movable parts in contact with the fuel composition. Operational disturbances such as pressure surges in the reactor vessel, or loss of pressure in the gas circuit automatically cause the fuel composition to be carried from the reactor vessel to the auxiliary vessel, whereby the steam production ceases. The combined volume of the auxiliary vessels used should be so large that the complete contents of the reactor vessel, moderator and fuel, can if necessary be taken up by them.

FIGURE 2 shows an arrangement which deviates from that in FIGURE 1 only with respect to the shape of the reactor vessel 1. The fuel composition is here divided into two zones by a partition 19, an inner core zone 20 containing moderator with fissile and possibly fertile material, and an outer reflector zone 21 containing moderator. The desired distribution of the moderator with fissile material in the core zone and substantially pure moderator in the reflector zone is established during normal operation of the system by leading the condensate from condenser 4, which is substantially pure moderator, via the conduit 7 and via the conduit 9, the auxiliary vessel 8 and the conduit 10 to the reflector zone. Through the continuous flow of condensed moderator to the reflector zone, the contents of the auxiliary vessel 8 will be substantially pure moderator and the fissile material is dissolved or dispersed in only one part of the moderator. Upon an emergency, when the total content of the reactor vessel is transferred to the auxiliary vessel, the fissile material will also be distributed between the two vessels.

In the arrangements shown in FIGURES 1 and 2, in which the flowing gas is led into the reactor vessel near the free liquid surface, the pressure difference between the reactor vessel and the auxiliary vessel is independent of the steam flow in the primary steam circuit provided that the other conditions, such as the flow resistance of the regulating means and the gas flow through the valve 14 remain unchanged. On the other hand, if the flowing gas instead of being led to the reactor vessel is led to a point in the primary steam circuit with a pressure which is lower than that in the reactor vessel, a pressure difference arises under the mentioned circumstances between the reactor vessel and the auxiliary vessel, which partly depends on the rate of steam production. If the steam production is increased, the pressure difference decreases so that the liquid is forced back into the auxiliary vessel.

FIGURE 3 shows a modified embodiment in which both the earlier methods of leading the gas flow to the reactor vessel and to the primary steam circuit respectively are combined in order to enable optimum control. Gas from one or several of the auxiliary vessels, in this case from the parallel connected vessels 22 and 23 and from the independent vessel 24 respectively, is divided into several flows each of which passes through a regulating means before being led to the reactor vessel or a point in the primary steam circuit respectively. One flow from the gas in the auxiliary vessels 22 and 23 thus goes through the regulating means 25 to an arbitrary point 26 in the primary steam circuit and one flow through the regulating means 27 to the reactor vessel 1. From the independent auxiliary vessel 24 one flow goes to the point 28 via the regulating means 29 and one to the reactor vessel 1 via the regulating means 30. The point 26 has a lower pressure than the pressure on the free liquid surface in the reactor vessel. This is schematically indicated in the figures through the regulating means 31. In the same way as in the arrangements described in FIGURES 1 and 2, the flowing gas is led via regulating valves 32 and 33 to the auxiliary vessels through pipes 34 and 35. The condensate tube 9 is divided into branch conduits 36, 37 and 38 with valves 39, 40 and 41 respectively. The connecting pipes between the auxiliary vessel and the reactor vessel have been designated 42, 43 and 44. The gas streams led through the regulating means 27 and 30 need not go to the reactor vessel, but may be connected to points in the primary steam circuit other than the points 26 and 28 respectively. FIGURE 3 shows only schematically an example of an embodiment of the invention. In practice a larger number of auxiliary vessels in many cases is used. It is also possible to use more than the two pipes from each auxiliary vessel containing resistors as shown in FIGURE 3, in order to improve the regulating possibilities.

As examples of the fuel compositions, with the use of which the method according to the invention can with advantage be employed may be mentioned dispersions in heavy water of thorium oxide with the addition of fissile materials such as U233, U235 and Pu239 or solutions in heavy or light water of uranyl sulphate containing enriched uranium. In the latter case the reactor vessel should be provided with a screen 19 according to FIGURE 2 or 3, manufactured for example from titanium which does not reduce the uranium salt. Suitable operational pressure is between 30–80 bar when the steam is to be used for the production of electric power. In other cases a lower pressure may be used.

The method according to the invention offers special advantages when fission gases formed in the reactor vessel in accordance with co-pending application Serial No. 72,205, filed on November 28, 1960, and entitled "Method and Means for Controlling the Quantity of Fission Gas in Homogeneous Boiling Reactors," are accumulated in the permanent gas used for regulating the pressure in the reactor vessel and the auxiliary vessels. In that case the permanent gas is supplied to the systems shown in FIGURES 1–3, at 13, 34, and 35 respectively from a permanent gas mass stored in containers and the permanent gas is then after passage of the systems returned to the gas mass from the points designated 17.

I claim:

1. Method of controlling the reactivity of a homogeneous nuclear reactor during operation, said reactor including a reactor vessel containing a moderator in the form of a liquid and fissile material incorporated in at least a part of the moderator, and a gas phase above the liquid moderator, said nuclear reactor producing vapor of the moderator and further including a primary vapor circuit connected to the vapor phase and having means therein to absorb the heat of and to condense the vapor, said reactor further including at least one subcritical auxiliary vessel having a gas phase and an open liquid communication between the reactor vessel and the auxiliary vessel, conduit means connecting the gas phase of the auxiliary vessel to the vapor phase of the reactor vessel, and regulating means in said conduit means producing resistance to flow of gas therethrough, the steps of maintaining the liquid communication open during operation of the reactor, causing a gas to flow through said conduit means from the auxiliary vessel to and through the reactor vessel and primary vapor circuit, and adjusting the flow of gas by the regulating means to regulate the distribution of moderator between the reactor vessel and the auxiliary vessel so as to control the level of moderator in the reactor vessel and thereby the reactivity of the reactor.

2. In a method as claimed in claim 1, in which the reactor vessel includes inner and outer liquid zones, and the moderator in the inner zone contains fissile material, the step of conducting liquid condensed in said condensing means to the outer zone so as to keep the fissile material concentrated in the inner zone.

3. In a method as claimed in claim 1, the step of conducting a part of the liquid condensed in said condensing means to the auxiliary vessel.

4. Method of controlling the reactivity of a homogeneous nuclear reactor during operation, said reactor including a reactor vessel containing a moderator in the form of a liquid and fissile material incorporated in at least a part of the moderator, and a gas phase above the liquid moderator, said nuclear reactor producing vapor of the moderator and further including a primary vapor circuit connected to the vapor phase and having means therein to absorb the heat of and to condense the vapor, said reactor further including at least one subcritical auxiliary vessel having a gas phase and an open liquid communication between the reactor vessel and the auxiliary vessel, conduit means connecting the gas phase of the auxiliary vessel to the primary vapor circuit, and regulating means in said conduit means producing resistance to flow of gas therethrough, the steps of maintaining the liquid communication open during operation of the reactor, causing a gas to flow through said conduit means from the auxiliary vessel to and through the primary vapor circuit, and adjusting the flow of gas by the regulating means to regulate the distribution of moderator between the reactor vessel and the auxiliary vessel so as to control the level of moderator in the reactor vessel and thereby the reactivity of the reactor.

5. In a method as claimed in claim 4, in which the reactor vessel includes inner and outer liquid zones, and the moderator in the inner zone contains fissile material, the step of conducting liquid condensed in said condensing means to the outer zone so as to keep the fissile material concentrated in the inner zone.

6. In a method as claimed in claim 4, the step of conducting a part of the liquid condensed in said condensing means to the auxiliary vessel.

7. A homogeneous boiling nuclear reactor comprising a reactor vessel containing a moderator in the form of a liquid and fissile material incorporated in at least a part of the moderator, and a gas phase above the liquid moderator, said nuclear reactor producing vapor of the moderator and further including a primary vapor circuit connected to the vapor phase and having means therein to absorb the heat of and to condense the vapor, said reactor further including at least one subcritical auxiliary vessel having a gas phase and an open liquid communication between the reactor vessel and the auxiliary vessel, conduit means connecting the gas phase of the auxiliary vessel to the vapor phase of the reactor vessel, regulating means in said conduit means producing resistance to flow of gas therethrough, means to feed gas under pressure to the vapor phase of the auxiliary vessel, means dividing the liquid space of the reactor vessel into inner and outer zones, and means to return condensed moderator from the condensing means to the outer zone.

References Cited in the file of this patent

UNITED STATES PATENTS

| 2,840,522 | Young et al. | June 24, 1958 |
| 2,949,414 | Ransohoff et al. | Aug. 16, 1960 |

OTHER REFERENCES

Proceedings of the Internation Conference on the Peaceful Uses of Atomic Energy," vol. 3, 1955, pages 169–174.